Jan. 24, 1967  F. D. ADSIT  3,300,043
APPARATUS FOR SEPARATING CRUSHED BATTERY PARTICLES
Filed Nov. 26, 1965  2 Sheets-Sheet 1
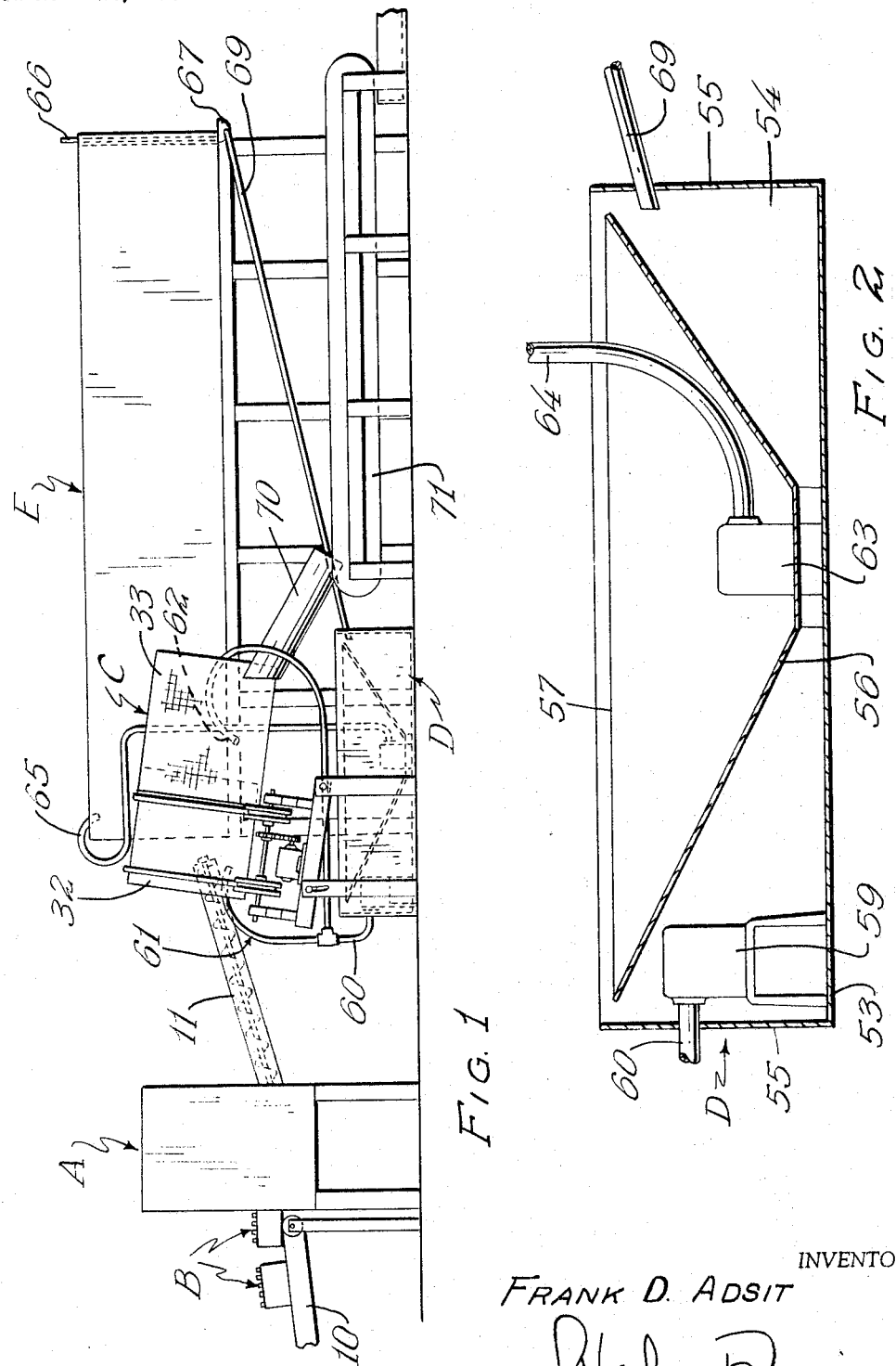
INVENTOR
FRANK D. ADSIT
BY
ATTORNEY Jan. 24, 1967     F. D. ADSIT     3,300,043
APPARATUS FOR SEPARATING CRUSHED BATTERY PARTICLES
Filed Nov. 26, 1965     2 Sheets-Sheet 2
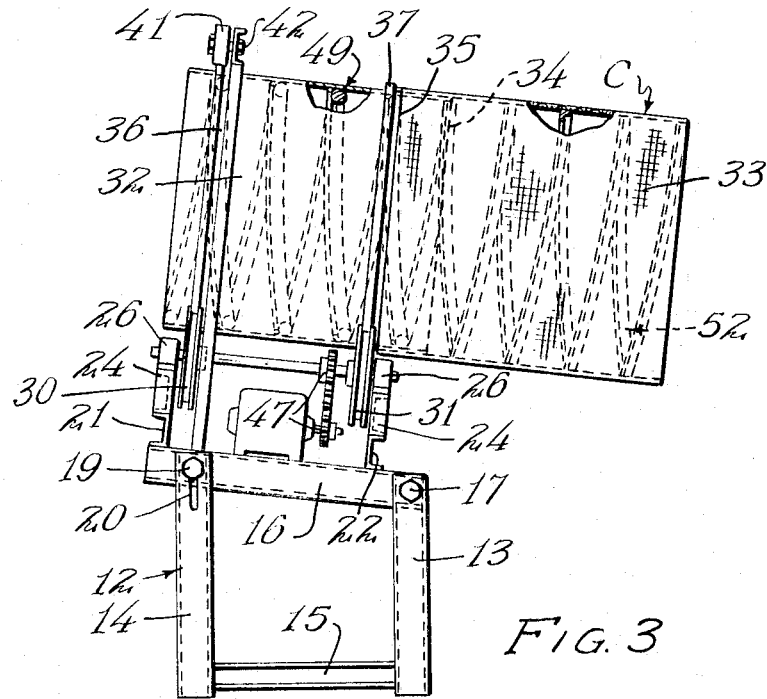
FIG. 3
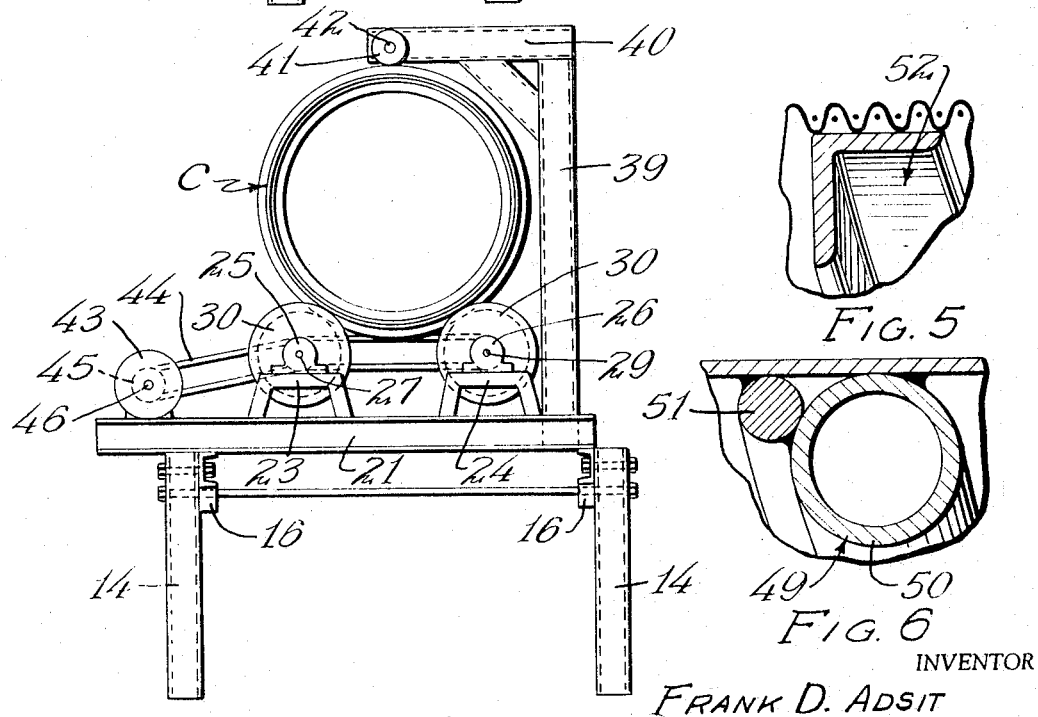
FIG. 4
FIG. 5
FIG. 6
INVENTOR
FRANK D. ADSIT
BY
ATTORNEY United States Patent Office 3,300,043
Patented Jan. 24, 1967

3,300,043
APPARATUS FOR SEPARATING CRUSHED
BATTERY PARTICLES
Frank D. Adsit, 1834 Orange Ave. E.,
St. Paul, Minn. 55119
Filed Nov. 26, 1965, Ser. No. 509,960
6 Claims. (Cl. 209—10)

This invention relates to an improvement in apparatus for recovering lead from storage batteries, and deals particularly with a method and apparatus for salvaging the lead from old automobile batteries and the like.

Storage batteries are usually produced with an outer casing of hard rubber or plastic defining a series of cells, and an interior unit including a series of lead plates which are suspended in the battery acid within the cells and sealed in place with a tar or asphalt-like substance. When storage batteries are worn out, the lead plates and interior structure is the only part of the battery which has much monetary value. Unfortunately, the recovery of the lead in the battery normally is relatively expensive due to the fact that the battery must be broken up in order to remove the plates. This is a somewhat difficult process due to the battery acid which quickly eats through protective clothing and gloves. It is difficult to secure labor willing to work in the presence of the battery acids. It is an object of the present invention to provide a means of recovering most of the lead from storage batteries which does not require the manual sorting of the lead from the remainder of the batteries.

An object of the present invention resides in the provision of a lead recovering apparatus which includes an enclosed battery breaker capable of breaking the entire battery into small parts, and separating the major portion of the solid particles from the battery acid. The battery breaker provides a mixture of lead, hard rubber or plastic, as well as broken plate separators. This mixture is fed into the upper open end of an inclined cylinder supported for rotation about its axis. The larger particles of lead are directed upwardly in the cylinder by an internal spiral rib. The lighter particles of plastic, hard rubber and the like are carried angularly with the wall of the cylinder rotating by the spiral rib and dropped down over the rib, and gradually travel axially toward the lower end of in the cylinder. The heavy lead particles are not carried angularly with the rotating cylinder wall to the extent necessary to drop over the spiral rib, and are accordingly gradually expelled from the open upper end of the cylinder.

A further feature of the present invention resides in the provision of a device of the type described in which the upper end of the cylinder is imperforate, while the lower end portion thereof is perforated or formed of screen. A spray of water is constantly directed upon the mixture of material passing through the lower end of the imperforate cylinder portion. This stream separates the heavy particles of lead which are small enough to be carried downwardly in the cylinder with the broken portions of the battery case, and wash these heavy particles through the screen. The broken portions of the battery case are conveyed downwardly over the screen by a spiral rib which is wound in a direction opposite the previously described spiral rib, and are discarded.

A further feature of the present invention resides in the provision of a recovery tank beneath the cylinder into which the lead and liquid may drop. The liquid and lead are pumped to a settling tank where the lead is separated from the liquid, and the liquid decanted off and recirculated.

These and other objects and novel features of the present invention will be more clearly and fully set forth in the following specification and claims:

In the drawings forming a part of the specification;
FIGURE 1 is a diagrammatic elevational view showing the lead recovering apparatus, showing the general arrangement of parts.
FIGURE 2 is an enlarged vertical sectional view showing the recovery tank.
FIGURE 3 is a side elevational view of the cylinder and its support.
FIGURE 4 is an end elevational view of the structure shown in FIGURE 3.
FIGURE 5 is an enlarged sectional detail through a portion of the cylinder and one of the spiral ribs.
FIGURE 6 is an enlarged detailed view showing in section a portion of the imperforate end of the cylinder and the other of the spiral ribs.

The general arrangement of parts is indicated in FIGURE 1 of the drawings. This figure diagrammatically illustrates the battery breaker A designed to receive batteries such as B from a conveyor 10. The battery breaker A breaks up the batteries B into small pieces which are conveyed by a conveyor 11 to a separating cylinder C. A collection tank D is positioned below the cylinder C to catch new liquid and lead passing through the perforations of the screen portion of the cylinder. From the tank D, the liquid and lead entrained therewith is pumped to a settling tank E which removes the solid particles from the liquid. The liquid from the settling tank E may be recirculated to the tank D for reuse.

The cylinder C is supported in the manner best illustrated in FIGURES 3 and 4 of the drawings. A table 12 includes a pair of shorter legs 13 and a pair of taller legs 14 held in spaced relation by a brace 15. A rectangular table-top 16 is pivotally secured to the legs 13 by aligned bolts 17, and adjustably supported by the legs 14 by bolts 19 extending through vertical slots 20 in the legs 14. The table-top is supported on an angle to the horizontal, the cylinder being supported with its axis sloping downwardly.

A pair of channel members 21 and 22 extend transversely across the table-top. A pair of longitudinally spaced brakets 23 and 24 are mounted upon each transverse channel 21 and 22 to support a pair of bearings 25 and 26. The bearings 25 and 26 on the two cross members are aligned and support a pair of parallel shafts 27 and 29. Grooved rollers 30 and 31 are supported upon the shafts 27 and 29 to support the cylinder C.

The cylinder C includes an imperforate upper end portion 32, and a perforated lower portion 33. The imperforate upper portion 32 extends to the line 34 while the perforated lower portion 33 extends to the line 35, the ends of the two screen portions being in telescoping relation. A pair of circular bands 36 and 37 encircle the imperforate upper portion 32 of the cylinder and engage in the grooves of the rollers 31 and 32 for support. An upright 39 extends upwardly from the table-top 16, the standard 39 supporting a cross arm 40 extending above the imperforate cylinder portion 32. A roller 41 is rotatably supported on an axis 42 above the center of the cylinder C. The roller 41 is designed to engage the band 36 to hold the band engaged in the grooves of the rollers 30.

A motor 43 is mounted upon the table-top 16. A belt or chain 44 connects a sprocket or pulley 45 on the shaft 46 of the motor 43 with cooperable sprockets such as 47 on the shafts 27 and 29 to rotate the shafts and the grooved rollers 30 and 31 mounted thereupon.

A spiral rib 49 is provided within the imperforate section 32 of the cylinder C. In the particular arrangement illustrated, the spiral rib 49 is formed of a spirally bent pipe 50 welded or otherwise secured to the intersurface of the cylinder section 32. Normally, a spirally bent rod 51 extends along an edge of the pipe 50 to provide a means of simplifying the welding of the pipe into the cylinder. A spiral rib 52 is also provided within the non-overlapped portion of the perforate section 33 of the cylinder. The rib 52 is shown as being angular in cross-section, as shown in FIGURE 5, one flange of the angle being flush against the inner-surface of the screen section.

The spiral rib 49 is bent in such a manner as to direct the heavy particles of lead uphill to the open upper end of the cylinder C, this lead dropping through the open upper end of the cylinder. The lighter particles of material are carried angularly with the wall of the cylinder by rotation thereof, this lighter material falling over the spiral rib and traveling axially toward the lower end of the cylinder in spite of the spiral rib 49. As the cylinder rotates, the heavy pieces of lead are only carried a relatively short angular distance by rotation of the cylinder before the weight of the lead causes it to tumble angularly down the wall of the cylinder and are never carried with the cylinder wall by the rotation a sufficient angular distance to drop over the rib. As a result, the major portion of the lead is separated in the imperforate section 32 of the cylinder.

The spiral rib 52 which is interiorly of the screen portion 33 of the cylinder is reversely bent from the rib 49, the rib 52 tending to guide material downwardly toward the open bottom end of the cylinder as the cylinder rotates. The heavy lead particles which escape separation in the upper portion of the cylinder, tend to pass through the screen or perforations when a spray of water is directed thereupon. Here again, the lighter particles of plastic and other foreign materials tend to be carried farther upon the screen than the heavier particles of lead. However, this action merely speeds the separation of these lighter particles due to the direction in which the rib 52 is spiralled.

The tank D is preferably formed as best illustrated in FIGURE 2 of the drawings. The tank D is shown as having an open topped rectangular body having a rectangular bottom panel 53 and connected side walls 54 and end walls 55. An inverted frusto-perimetral inner tank 56 is supported within the outer tank and acts to catch the liquid and lead particles passing from the cylinder C. The inner tank 56 has its upper edge 57 slightly below the level of the outer tank, and at least portions of the walls of the two tanks are spaced so that if the inner tank overflows, the overflow will drain into the outer tank.

A fluid pump 59 is provided within the outer tank, and is connected by a tubular connection 60 to a first outlet pipe 61 leading into the interior of the imperforate section 32 of the cylinder C. A second outlet 62 terminates within the screen section 33 of the cylinder C. Thus, the material being separated is constantly sprayed.

A fluid pump 63 is provided within the inner tank 56 and is connected by a conduit 64 to an outlet 65 leading into one end of the settling tank E. The tank E is provided with a removable door 66 through which the material collected in the settling tank may be removed from time to time. The bottom part of the tank E is encircled by a trough or gutter. A conduit 69 leads from the gutter 67 to the interior of the outer tank D outwardly of the inner tank 56. The door 66 is not liquid tight, permitting liquid to constantly drain into the trough 67 and to return through the conduit 69 to the tank D. After the solid particles have settled into the settling tank E, the water is permitted to return to the tank D for recirculation.

A shute 70 extends beneath the lower end of the cylinder C, and terminates over an endless conveyor 71 which may be used to convey the broken portions of the battery casings and other waste materials away. The apparatus and the method has been responsible for reclaiming a very high proportion of the lead from the batteries, and the entire method can be carried on by merely supplying the batteries to the battery breaking device A, and removing the highly concentrated particles of lead and waste materials from the apparatus after the process is completed.

In accordance with the patent statutes, I have described the principles of construction and operation of my improvement in battery breaking method and apparatus, and while I have endeavored to set forth the best embodiment thereof, I desire to have it understood that changes may be made within the scope of the following claims without departing from the spirit of my invention.

I claim:

1. A lead recovery apparatus for use in recovering the lead from prebroken storage batteries, the apparatus including:
   an inclined rotatable cylinder having an imperforate upper end and a perforate lower end,
   a spiral rib within said imperforate cylindrical portion and operable upon rotation of said cylinder to move heavy lead portions toward and through the upper end of said cylinder, feed means extending into said cylinder for depositing the prebroken batteries intermediate the ends of the imperforate portion of said cylinder,
   an oppositely spiraled rib within said perforate cylindrical portion designed to direct material from the lower end of said cylinder upon rotation thereof,
   a spray within said cylinder to wash smaller pieces of lead through said perforate cylinder portion, and
   a tank beneath said cylinder to receive liquid and small particles of lead therefrom.

2. The structure of claim 1 and in which the first mentioned rib is generally circular in cross-section.

3. The structure of claim 2 and in which the second described rib is of angular cross-section.

4. The structure of claim 1 and including a settling tank and means for pumping liquid and collected lead particles from said first named tank to said settling tank.

5. The structure of claim 4 and including means for returning liquid from said settling tank to said first named tank.

6. The structure of claim 1 and in which said tank includes an inner tank and an outer tank extending above the level of said inner tank to accommodate liquid flowing over the top of said inner tank.

References Cited by the Examiner

UNITED STATES PATENTS

| | | | |
|---|---|---|---|
| 993,593 | 5/1911 | Guernsey | 209—473 |
| 2,577,488 | 12/1951 | Stephanson | 209—473 X |
| 2,942,792 | 6/1960 | Anderson | 241—14 |
| 3,004,721 | 10/1961 | Notzold | 241—14 X |

FRANK W. LUTTER, *Primary Examiner.*